United States Patent
Reed et al.

(10) Patent No.: US 7,963,019 B2
(45) Date of Patent: Jun. 21, 2011

(54) METHOD OF ROLL-FORMING AN AUTOMOTIVE SUPPORT MEMBER

(75) Inventors: John Reed, Hudson, OH (US); James Lowe, Temperance, MI (US); Lawrence Queener, Pinckney, MI (US); Hikmat Mahmood, Bloomfield Hills, MI (US); Henry Hausler, Manchester, MI (US); Joe Weishaar, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1338 days.

(21) Appl. No.: 11/508,061

(22) Filed: Aug. 22, 2006

(65) Prior Publication Data

US 2008/0052908 A1 Mar. 6, 2008

(51) Int. Cl.
*B23P 11/00* (2006.01)
(52) U.S. Cl. .............. 29/525.14; 29/897.2; 293/102
(58) Field of Classification Search .............. 29/525.14, 29/897.2; 293/102
See application file for complete search history.

(56) References Cited

U.S. PATENT DOCUMENTS

| | | | | |
|---|---|---|---|---|
| 6,923,482 | B2* | 8/2005 | Cumming et al. | 293/102 |
| 6,948,749 | B2* | 9/2005 | Graber | 293/102 |
| 7,007,989 | B2* | 3/2006 | Yoon | 293/120 |
| 7,293,823 | B2* | 11/2007 | Chen et al. | 296/203.03 |
| 7,431,378 | B2* | 10/2008 | Chen et al. | 296/102 |
| 2004/0262930 | A1* | 12/2004 | Cumming et al. | 293/120 |

* cited by examiner

*Primary Examiner* — C. J Arbes
(74) *Attorney, Agent, or Firm* — Frederick Owens, Esq.; Miller Law Group, PLLC

(57) ABSTRACT

A roll-forming process for the manufacture of a structural member can be used in the manufacture of an automotive vehicle. The roll-forming process creates a component that has multiple cells with an integral internal web separating the cells, enhancing the strength, rigidity and stiffness of the component for any given size and shape. The roll-forming process starts with a piece of sheet metal and rolls the sheet metal into a desired shape and then rolls the tube back over on itself to create a second cell with the internal reinforcing web positioned between two structural cells of the beam. The rolled form is then welded into the formed shape to create the structural beam. The two cells of the beam can be the same general size or be formed as completely disparate sizes, depending on the design requirements of the structural member.

15 Claims, 6 Drawing Sheets

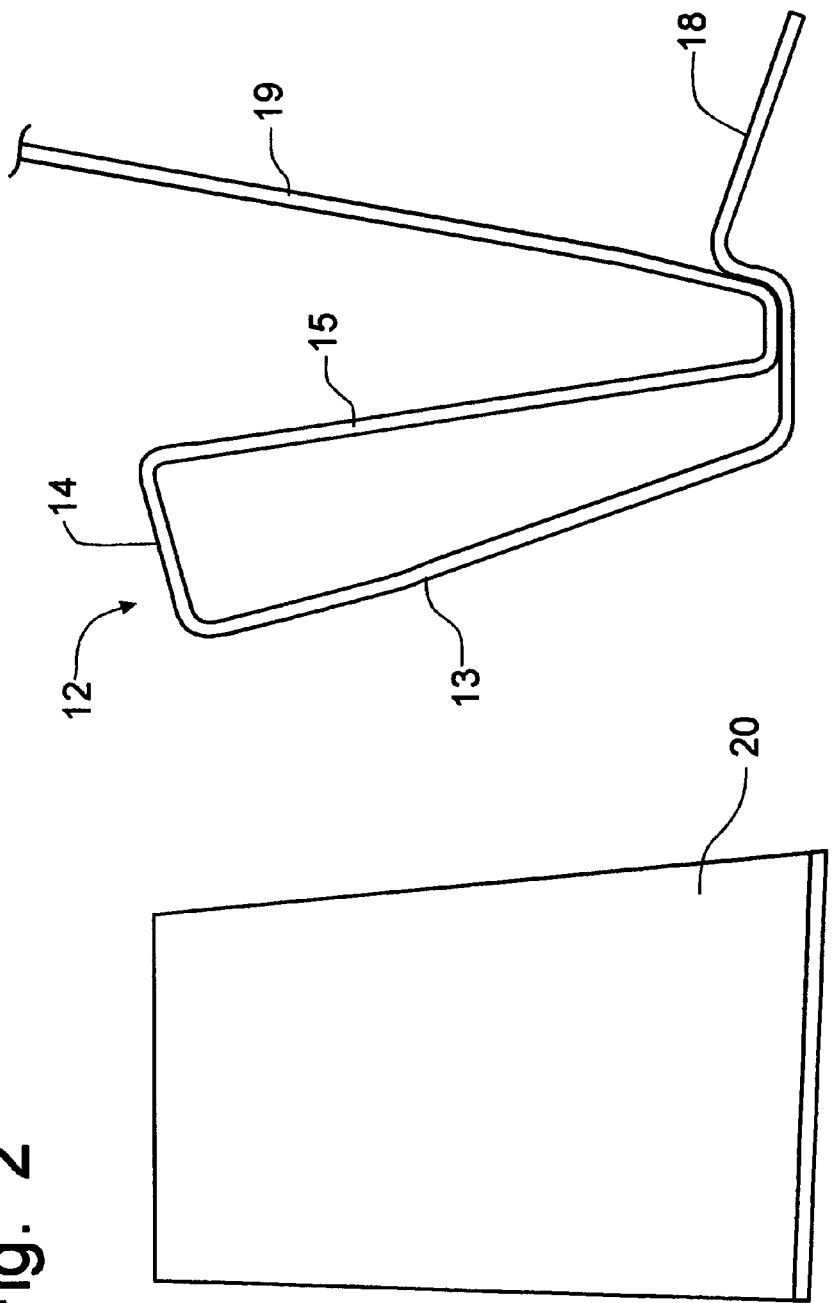

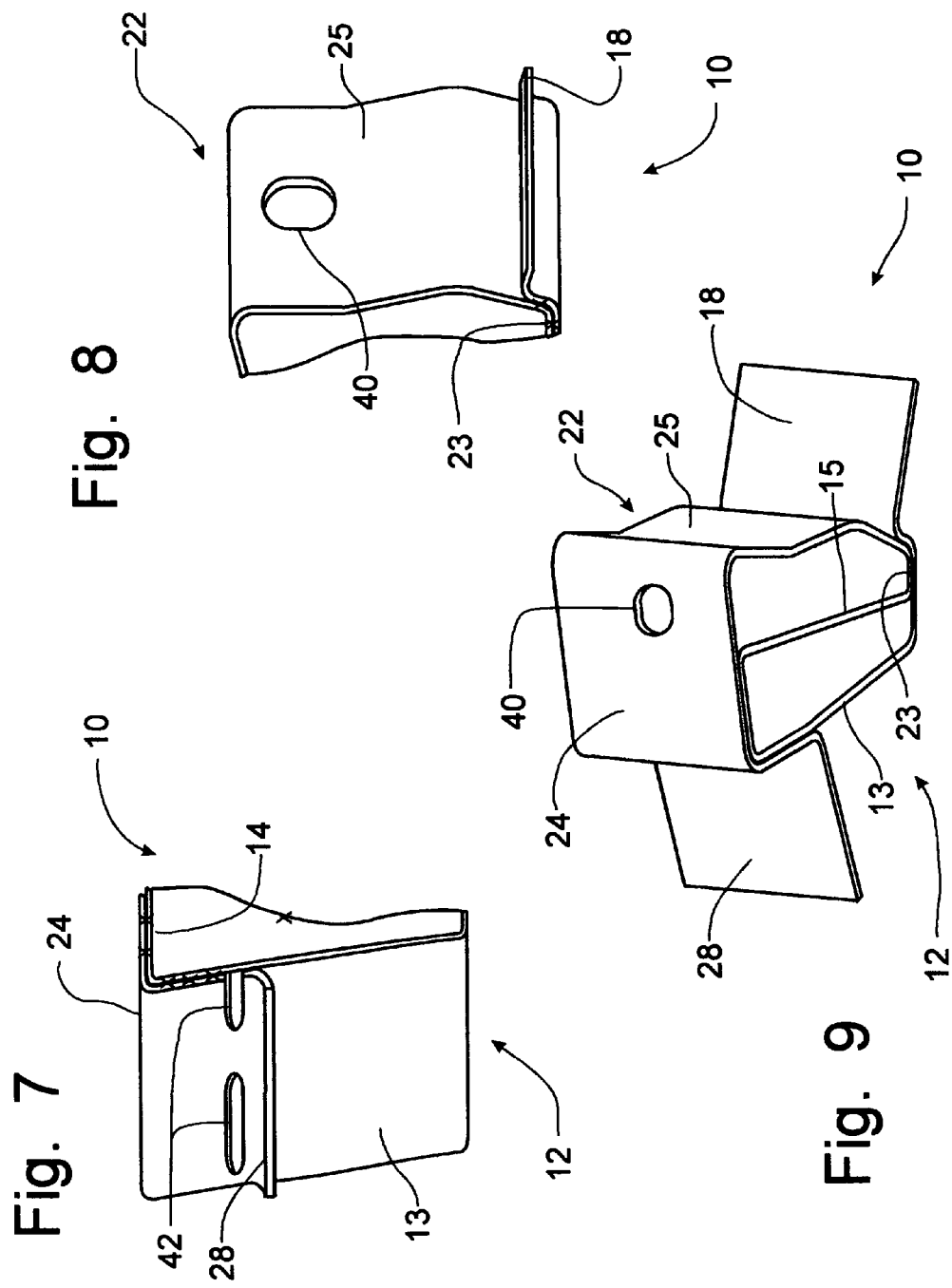

METHOD OF ROLL-FORMING AN AUTOMOTIVE SUPPORT MEMBER

FIELD OF THE INVENTION

This invention relates generally to the manufacturing of structural members for use in automobiles and, more particularly, to a process for roll-forming sheet metal into a structural beam having an internal web to increase strength of the beam.

BACKGROUND OF THE INVENTION

Manufacturing processes for automobiles have evolved from one that utilized primarily stamped and bent sheet metal pieces that were welded together through a MIG welding processes, i.e. a welding process in which a line of molten material is deposited by the welder in joining two pieces of metal together. Now, conventional automobile manufacturing processes incorporate in a greater degree hydroformed tubular members that are shaped to fit into the chassis of an automobile in a desired manner. The hydroformed members are particularly conducive to being welded through a spot-welding process, which involves the passage of electrical current between two electrodes to melt and join two pieces of metal placed between the electrodes. Spot-welding requires a frame design having appropriate access holes that is conducive to being manufactured using the spot-welding process. For example, if two tubular members are being spot-welded together, access to the adjoining walls of the two tubular members by the spot-welder electrodes must be provided. Other welding techniques, such as gas metal arc welding (GMAW), are also be utilized for welding tubular designs.

Roll-forming is a process for forming a structural tubular member involving the transformation of a piece of flat sheet metal into the structural beam by passing the sheet metal through a series of rollers arranged to bend the sheet metal into the structural beam. Generally, tubular members are formed through the roll-forming process. These tubular members can be used directly in the manufacture of an apparatus, such as an automobile, or be used in a subsequent manufacturing process called hydroforming to create a specially shaped and bent structural member that roll-forming cannot by itself create.

Hydroforming is a process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members. Once the hydroformed part is formed, attachment brackets are attached to the part to permit other components of the automobile to be mounted. Typically, these attachment brackets are welded to the hydroformed part by either a MIG or spot-welding process, whereupon the other components can then be bolted or welded to the attachment brackets.

Whether hydroformed or merely roll-formed, the structural tubular member is not conventionally formed with any internal reinforcement and, thus, the walls of the tubular member must carry the entire load placed on the structural member and provide the requisite stiffness needed for the structural member to perform its operative function. The load carrying ability of the tubular member is a limiting factor in the design of hydroformed or roll-formed structural members and can result in a non-optimized beam design having increased material thickness in the walls of the beam or increased tube diameter. Either of these enhanced load carrying characteristics leads to an expensive overweight design. Furthermore, the increasing of the tube diameter causes problems in the packaging of the enhanced design, making automotive design more difficult.

Accordingly, it would be desirable to provide a manufacturing process by which the structural beam can be formed with multiple tubular cells that provide a single structural member having an integral internal reinforcement to increase structural strength for a roll-formed beam of a given size and shape.

SUMMARY OF THE INVENTION

It is an object of this invention to overcome the aforementioned disadvantages of the known prior art by providing a roll-forming process to create a tubular structural member that has an internal web reinforcement.

It is another object of this invention to provide a roll-forming process for manufacturing a structural tubular member having multiple cells.

It is still another object of this invention to roll-form a flat sheet of metal into a shaped tubular beam by rolling the sheet metal on top of itself to form an internal reinforcement web between two structural cells.

It is an advantage of this invention that a roll-formed structural member can have increased strength for a given size and shape due to an integral internal reinforcement separating the cells of the structural member.

It is another advantage of this invention that the cost of manufacturing automobiles can be reduced.

It is a feature of this invention that the roll-formed structural beam is manufactured with an internal rib forming a reinforcement along the entire length of the beam.

It is another feature of this invention that the roll-formed structural beam is formed in a fashion that creates two cells with a rib member separating the two cells.

It is still another advantage of this invention that the roll-formed component, manufactured into multiple cells with an internal rib separating the cells to reinforce the component, increases strength, rigidity and stiffness of the structural component, while maintaining a predetermined size and shape.

It is another advantage of this invention that the improved roll-forming process enhances the structural properties of the component without adding additional parts or external reinforcements to the component.

It is a further object of this invention to provide a roll-forming process that creates an automotive component with multiple cells having an integral internal rib reinforcement that is durable in construction, inexpensive of manufacture, carefree of maintenance, facile in assemblage, and simple and effective in use.

These and other objects, features and advantages are accomplished according to the instant invention by providing a roll-forming process for the manufacture of a structural member that can be used in the manufacture of an automotive vehicle. The roll-forming process creates a component that has multiple cells with an integral internal web separating the cells, enhancing the strength, rigidity and stiffness of the component for any given size and shape. The roll-forming process starts with a piece of sheet metal and rolls the sheet metal into a desired shape and then rolls the tube back over on itself to create a second cell with the internal reinforcing web positioned between two structural cells of the beam. The rolled form is then welded into the formed shape to create the structural beam. The two cells of the beam can be the same general size or be formed as completely disparate sizes, depending on the design requirements of the structural member.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a perspective view of a piece of sheet metal from which the pillar of FIG. 1 is formed according to the principles of the instant invention;

FIG. 3 is an end view of the structural member following a first formation stage of the roll-forming process to create the pillar of FIG. 1;

FIG. 7 is a partial perspective view of the A-pillar beam to depict the formation of optional slots formed in the outer in the outer wall of the first cell to permit certain welding techniques, such as laser edge welding;

FIG. 8 is a partial perspective view of the opposing side of the A-pillar shown in FIG. 7 to depict an optional opening in the second cell for internal access for welding purposes; and FIG. 9 is a partial perspective view of the A-pillar to show an optional weld access opening.

DETAILED DESCRIPTION OF THE PREFERRED EMBODIMENT

Figure 1:
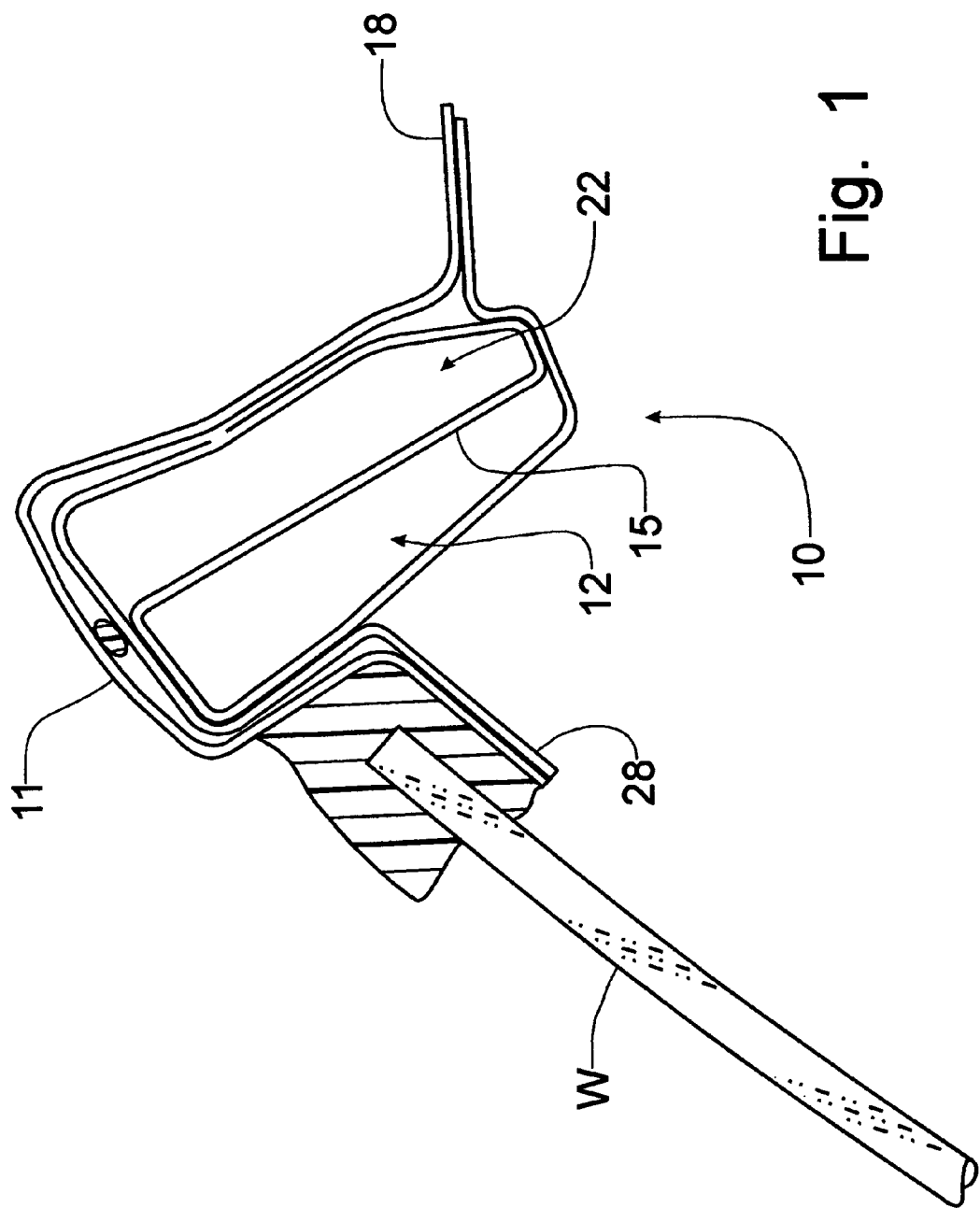
FIG. 1 is a representative cross sectional view of a pillar forming part of an automotive frame manufactured from a piece of sheet metal using a roll-forming process according to the principles of the instant invention.

Referring to FIGS. 1-4, a structural beam formed according to the principles of the instant invention can best be seen. The structural member 10 can be used in a variety of devices in known manners, such as is depicted in FIG. 1, which is the A-pillar 10 of an automobile. Generally, automotive frame design requires structural components with this particular shape, size and configuration, which when assembled together form the chassis of an automotive vehicle. The A-pillars 10 are generally vertical frame members located at the front corners of the automobile to support the front part of the roof (not shown), the windshield W, side glass (not shown), and the front doors (not shown). The envelope 11 in which the A-pillar is positioned has a limited size and certain characteristics relating to the strength, rigidity and stiffness for the component 10 have to be maintained. To increase the strength or other properties of this particular structural component 10, external reinforcements (not shown) or additional parts (not shown) could be added strategically to the structural member 10 as needed. Such additional parts or reinforcements add manufacturing steps, and additional materials to attain the requisite structural properties, and thus, increase the cost of manufacturing the component and the automotive vehicle into which this component 10 is assembled.

Figure 4:
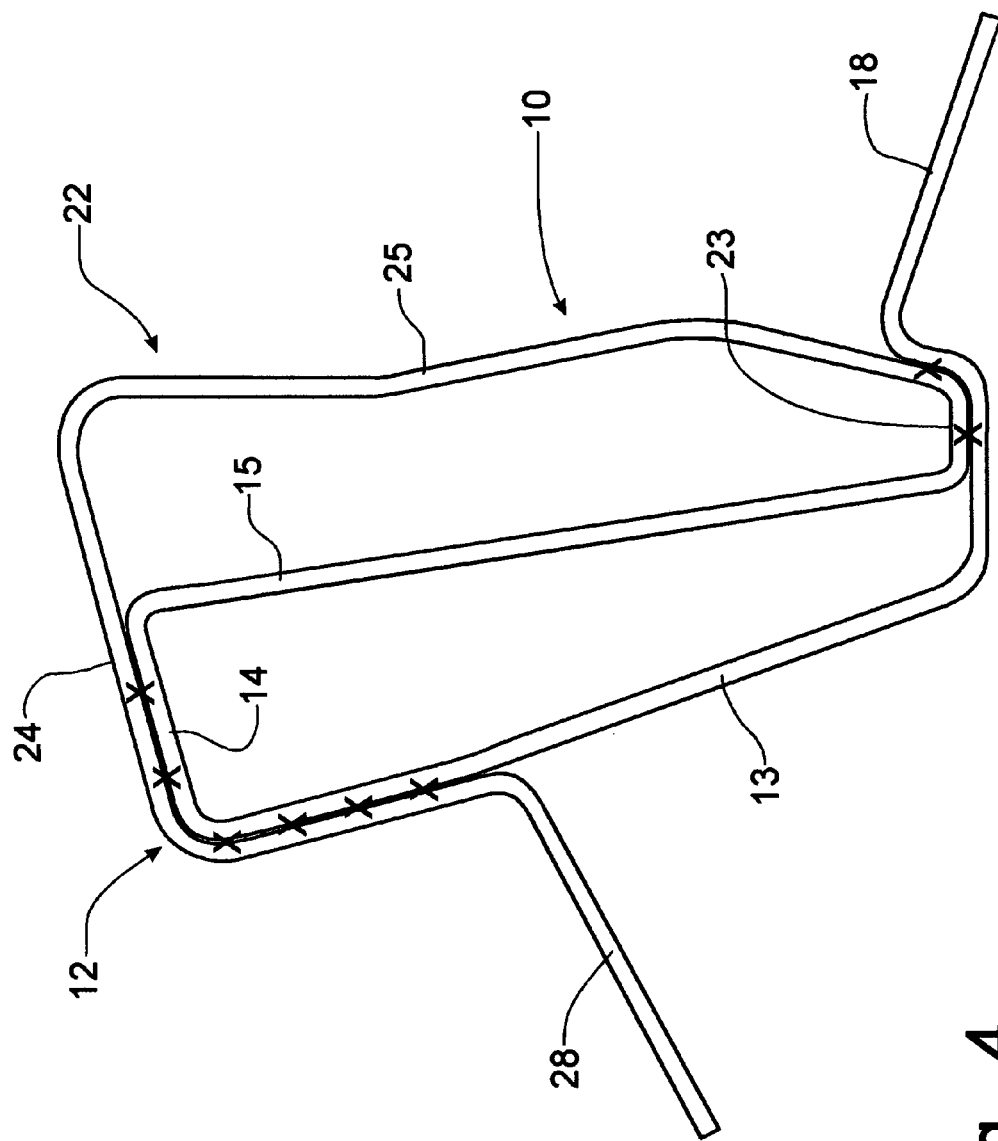
FIG. 4 is an end view of the structural member following a second formation stage and welding overlapping portions to form the pillar depicted FIG. 1.

As is reflected in FIGS. 2-4, the A-pillar 10 is manufactured through a roll-forming process during which a flat piece of sheet metal 20 is passed through a series of properly arranged rollers (not shown), as is known in the art, to bend the sheet metal 20 into a first cell 12 during a first stage of formation of the structural member 10. The first cell 12 has an outer wall 13, a side wall 14 and an inner wall 15. Because of the particular utilization of this structural member 10 as an A-pillar, the first cell is also formed with a first mounting flange 18 and a second cell flange 19.

The first cell 12 and the second cell flange 19 are then passed through a second stage of rollers (not shown) to effect a bending of the second cell flange into a second cell 22 that folds back over the first cell 12 such that the second cell 22 is formed with a first end wall 23 that is positioned against the first mounting flange 18, and a second end wall 24 that overlaps the side wall 14 of the first cell 12 and terminates in a second mounting flange 28. Because of the particular application of this structural beam 10 as an A-pillar the mounting flange 18 bends around a portion of the outer wall 13 of the first cell before extending outwardly therefrom for connection to supporting structure of the vehicle chassis. The first and second end walls 23, 24 are separated by an exterior wall 25. In this particular configuration, the A-pillar is formed in a generally trapezoidal shape such that the first and second cells 12, 22 are also shaped generally as trapezoids with the outer wall 13 and the exterior wall 25 being the primary external walls of the A-pillar with the inner wall 15 defining a reinforcing web extending generally parallel midway between the two primary external walls 13, 25.

Welding the first end wall 23 to the first mounting flange 18 against which the first end wall 23 rests, as well as welding the overlapping areas of the second end wall 24 of the second cell 22 and the side wall 14 of the first cell 12, and optionally the overlapping areas of the second mounting flange 28 and the outer wall 13 of the first cell 12, as is represented by the "x" designators in FIG. 4, secures the beam 10 in the two cell configuration with an internal reinforcement web 15 and provides a structural member that can be used in the design of an automotive frame. One skilled in the art will readily recognize that the specific shape of the structural beam 10 can be designed to fit the strength and stiffness parameters associated with the utilization of the beam 10. The principles of the instant invention would have the structural beam 10 formed with a first cell and then with a second cell that folds back onto the first cell to provide a two cell structural beam with one of the walls of the first cell 12 becoming the internal reinforcement web 15 for the beam 10.

Welding can be accomplished through many known procedures, including MIG welding, spot welding, and other welding techniques, such as gas metal arc welding (GMAW). As can best be seen in FIGS. 7-9, these certain welding techniques can best be utilized if slots 42 or openings 40 are pre-punched into the sheet metal blank 20 to be properly positioned upon formation of the beam 10 to permit access into the interior of the cells 12, 22. For example, as depicted in FIG. 7, the slots 42 formed into the outermost thickness of sheet metal at the overlap area on the first cell 12 allow the use of laser edge welding or GMAW welding techniques to join the layers of overlapping sheet metal. The access opening 40 in the exterior wall 25 of the second cell 22 would need to be aligned with a correspondingly located opening (not shown) in the internal reinforcing web 15 to permit access into the first cell for spot-welding the overlapping areas of the first cell 12. Similarly, the weld access opening 40 in the end wall 24, shown in FIG. 9 would allow spot-welding techniques to be utilized at the end wall 23. Accordingly, appropriately positioned openings 40, 42 will facilitate the welding of the cells 12, 22 to form the integral beam 10. Preferably, the slots 40 are placed in the single thickness walls of the cells 12, 22; however, the slots can also be formed in the overlapping sections, though alignment of the slots 40 in one wall with the slots in the overlapping wall can be problematic.

Figure 5B:
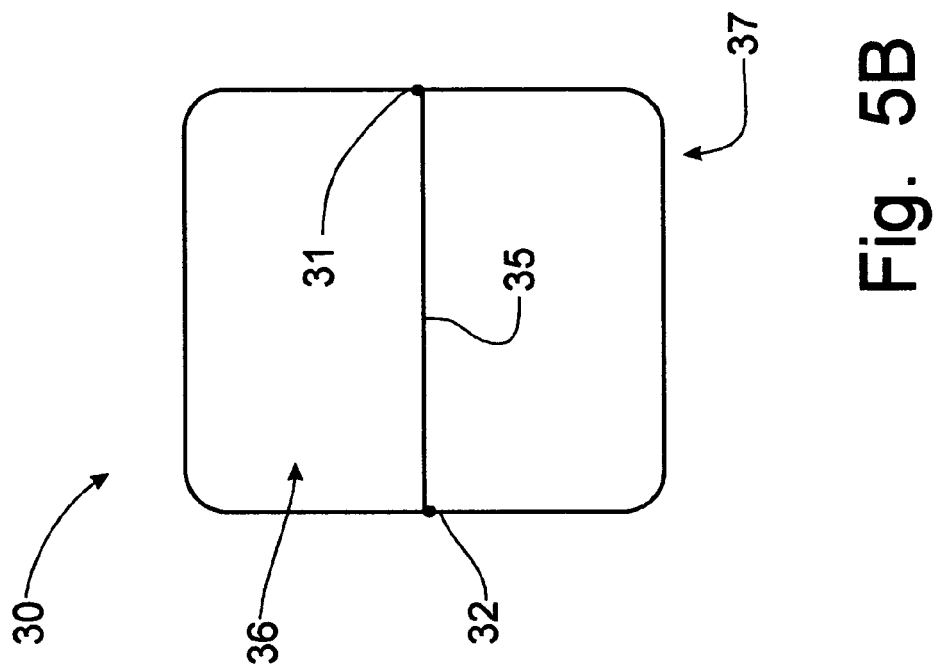
FIG. 5B is an end view of a second embodiment of the roll-formed beam having an internal web after the final stage of formation, this second embodiment being particularly adapted for further formation through a subsequent hydroforming process.
Figure 5A:
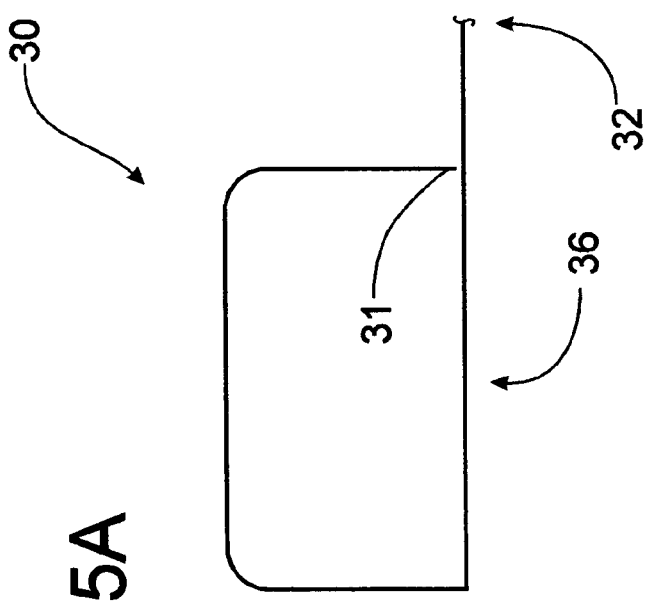
FIG. 5A is an end view of a second embodiment of the roll-formed beam having an internal web showing a first stage of formation according to the principles of the instant invention.

Referring now to FIGS. 5A-6B, additional configurations of the two cell roll-formed structural member 30 can be seen. In FIGS. 5A and 5B, the structural member 30 starts with a flat piece of sheet metal parent material, as depicted in FIG. 2, and rolls the sheet metal parent material into a cellular configuration that forms the first cell 36 from a portion of the sheet metal and then rolls the remaining parent sheet metal back against the first cell 36 to form the second cell 37. While the two cells 36, 37 can be formed in a generally circular configuration or in a box-like configuration, as depicted in the drawings, the structural member 30 is formed so that the second end 32 mates against the side of the upper cell 36 with the second end 32 being welded to the outside of the second cell 36. The first end 31 of the parent sheet metal is then welded to the outside of the lower cell 37 at a position that is spaced from the second end 32 with an intermediate strip 35 of the parent material extending between the first and second ends 31, 32. Since the structural member 30 is formed from a continuous piece of sheet metal parent material extending from the first end 31 to the second end 32, the strip 35 is an integral part of the blank 30. Furthermore, the strip 35 forms the barrier between the upper and lower cells 36, 37 and creates an internal reinforcement web.

Figure 6B:
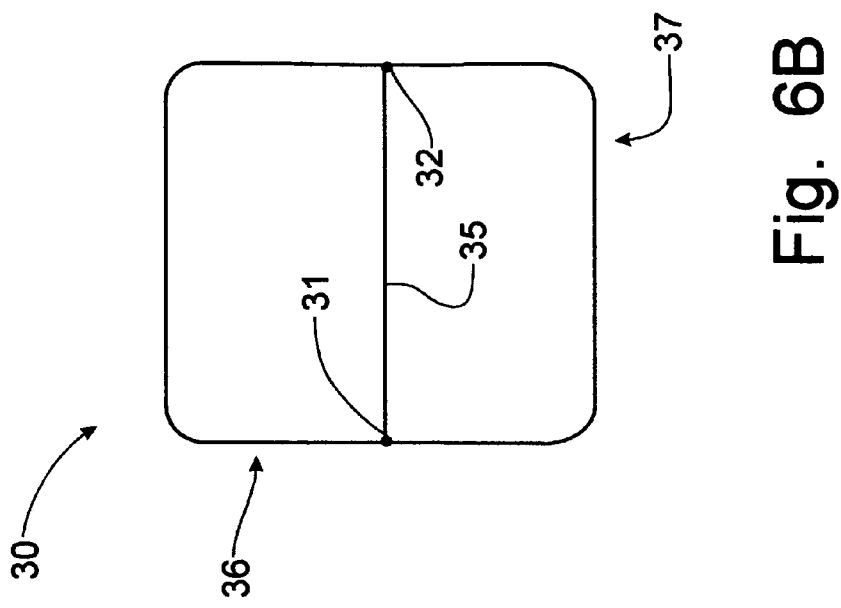
FIG. 6B is an end view of a third embodiment of the roll-formed beam having an internal web after the final stage of formation, this third embodiment also being particularly adapted for further formation through a subsequent hydroforming process.
Figure 6A:
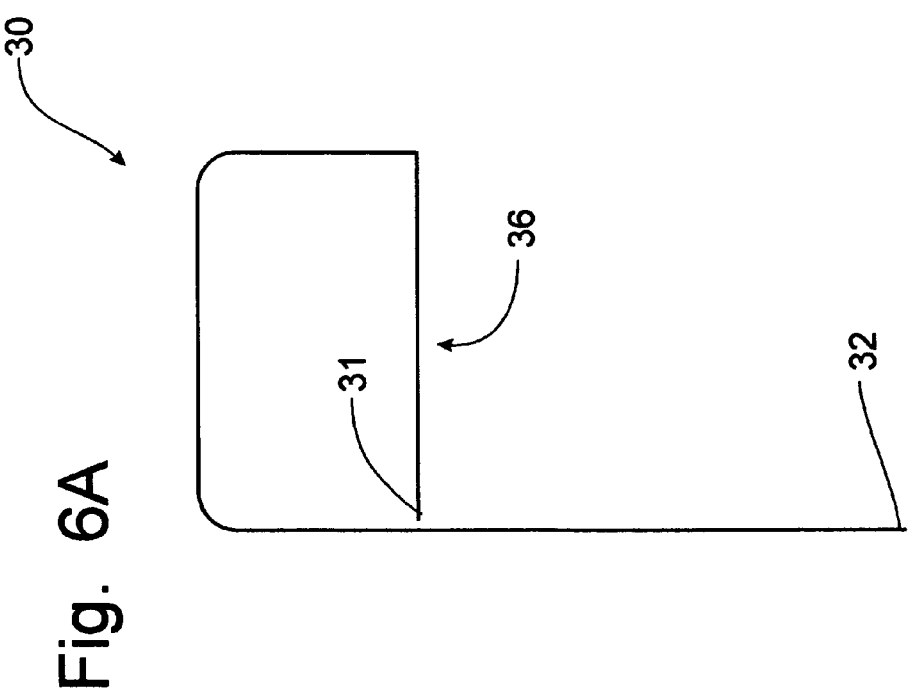
FIG. 6A is an end view of a third embodiment of the roll-formed beam having an internal web showing a first stage of formation according to the principles of the instant invention.

An alternative configuration for the dual cell structural member 30 can be seen in FIGS. 6A-6B in which the first end 31 is rolled into the first cell 36 and then into the second cell 37. The first end 31 is welded to a point on the sheet metal to define the first cell 36, while the second end 32 is welded along the first cell 36 at a distance spaced from the first end 31 such that the strip of sheet metal becoming the barrier 35 between the first and second cells 36, 37 extends from the first end 31, rather than along an intermediate strip of the sheet metal per the configuration of FIG. 5A-5B. Either configuration of the dual cell structural member 30 works satisfactorily in a subsequent hydroforming process, particularly if the first and second cells 36, 37 are formed in a generally circular configuration; however, certain characteristics of one configuration may be desired over the other, as can be recognized below.

Although the first and second cells 36, 37 of the structural member are depicted as being substantially the same size, the roll-forming process through which the structural members 30 are manufactured does not require that the cells 36, 37 be the same size or even the same shape. If the envelope in which the beam 30 is to be placed, or the operational characteristics desired for the beam, requires different sizes or shapes of the respective cells 36, 37, such a configuration can be easily arranged.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method of roll-forming an automotive support member from a stock of parent sheet metal comprising the steps of:
    forming a first closed cell with first and second opposing wall portions leaving a remaining portion of parent sheet metal;
    rolling the remaining portion of parent sheet metal back against the first closed cell to form a second closed cell with the second wall portion forming a wall of the second closed cell and being positioned as an internal reinforcement web between the first and second cells.

2. The method of claim 1 further comprising the step of:
    welding the second cell to the first cell to secure the configuration of the automotive support member.

3. The method of claim 2 wherein the rolling step positions the remaining portion of sheet metal forming the second cell in an overlapping relationship with at least a portion of the first cell.

4. The method of claim 3 wherein the welding step welds the overlapping portions of the first and second cells.

5. The method of claim 4 wherein the forming step configures the first cell into a box-like shape with a pair of opposing walls defining the opposing wall portions, one of the opposing walls becoming the internal reinforcement web after the rolling step creates the second cell.

6. The method of claim 5 wherein the first and second cells are substantially the same size and shape.

7. The method of claim 5 wherein the first and second cells have disparate sizes.

8. The method of claim 2 wherein the parent sheet metal has a first end and an opposing second end, the forming step positioning the first end against a first intermediate point of the parent sheet metal, while the rolling step positions the second end at a second intermediate point on the parent material spaced from the first intermediate point, the portion of the parent sheet metal between the first and second intermediate point defining the reinforcement web.

9. The method of claim 8 wherein the welding step welds the first end to the parent sheet metal at the first intermediate point to define the first cell and welds the second end to the parent sheet metal at the second intermediate point to form the second cell with the reinforcement web being oriented between the first and second cells.

10. In a method for roll-forming an automotive frame component from a stock of parent sheet metal into a desired shape, the improvement comprising the steps of:
    forming a first closed cell of the desired shape with first and second opposing walls from a first portion of the parent sheet metal leaving a remaining portion of parent sheet metal;
    rolling the remaining portion of parent sheet metal back against the first closed cell to form a second closed cell to complete the desired shape with one of the first and second opposing walls forming a wall of the second closed cell and being positioned as an internal reinforcement web between the first and second cells.

11. The method of claim 10 further comprising the step of: welding the second cell to the first cell to secure the desired shape of the automotive frame component.

12. The method of claim 11 wherein the rolling step positions the remaining portion of sheet metal forming the second cell into an overlapping relationship with at least a portion of the first cell.

13. The method of claim 12 wherein the welding step welds the overlapping portions of the first and second cells.

14. The method of claim 11 wherein the parent sheet metal has a first end and an opposing second end, the forming step positioning the first end against a first intermediate point of the parent sheet metal, while the rolling step positions the second end at a second intermediate point on the parent material spaced from the first intermediate point, the portion of the parent sheet metal between the first and second intermediate point defining the reinforcement web.

15. The method of claim 14 wherein the welding step welds the first end to the parent sheet metal at the first intermediate point to define the first cell and welds the second end to the parent sheet metal at the second intermediate point to form the second cell with the reinforcement web being oriented between the first and second cells.

* * * * *